April 26, 1932. L. A. SANDERS 1,855,652
FLYING MACHINE
Filed April 29, 1931
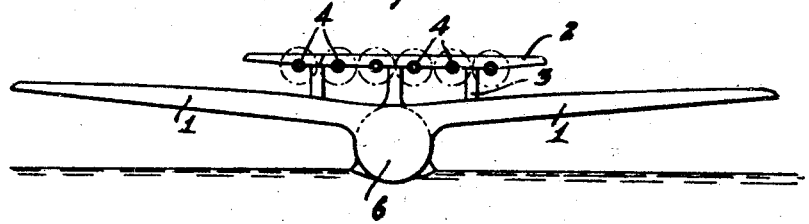
Fig. 1.
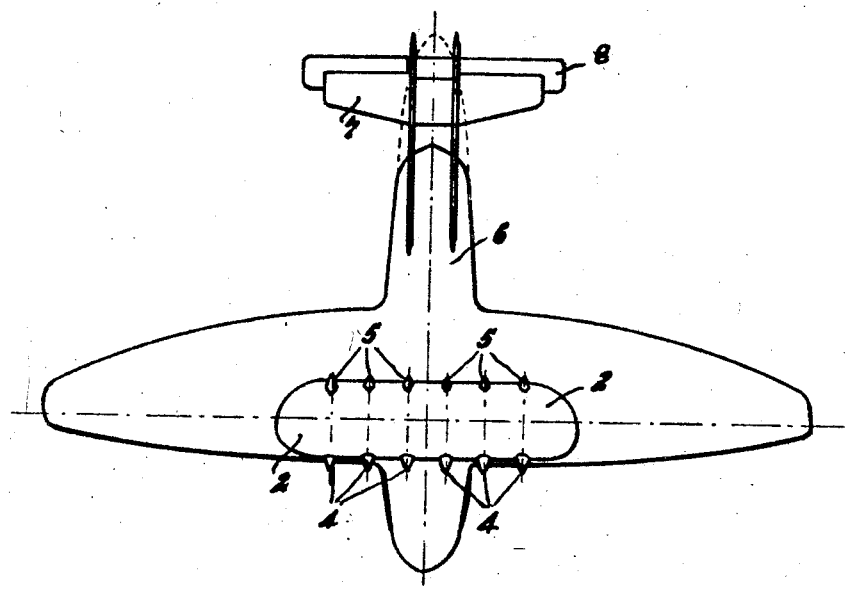
Fig. 2.
Fig. 3.
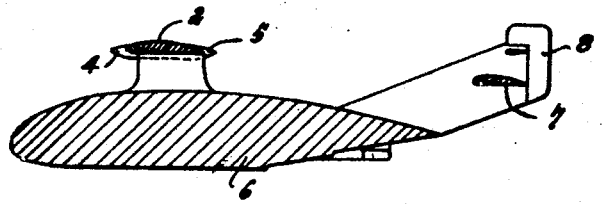
Inventor:
Ludwig Adrian Sanders
By
Attorney Patented Apr. 26, 1932

1,855,652

UNITED STATES PATENT OFFICE

LUDWIG ADRIAN SANDERS, OF VOORBURG, NETHERLANDS, ASSIGNOR TO JOHANN ANTON SANDERS, OF VOORBURG, NETHERLANDS, AND FRANS LAMBERT STOOT, OF THE HAGUE, NETHERLANDS

FLYING MACHINE

Application filed April 29, 1931, Serial No. 533,803, and in the Netherlands May 2, 1930.

The invention relates to flying machines, especially to large flying machines having a plurality of engines.

According to the invention the engines together with the further construction parts belonging to the driving means, are arranged in or to a special engine wing which is of such dimensions, that at full power it keeps in equilibrium the weight of all the engines with the further construction parts belonging thereto and of the service load, as well as that of the engine wing itself and the interplane-stays, if necessary also that of the fuel and lubricant stored in the same.

The improvement is to be seen in the fact, that the engine wing with the engines only exert a propelling power to the further part of the airplane.

The construction parts belonging to the driving means comprise the engine, the cooling devices, the fuel containers, lubricating devices, starting devices, propellers, and controlling devices of the engines. The service load comprises the cooling means and those quantities of fuel, lubricant and liquids e. g. for hydraulic action which cannot be consumed. (This as established in the publications of the "Deutsche Versuchsanstal: "ir Luftfahrt.")

A flying machine embodying my improvements is illustrated in the annexed drawings.

Fig. 1 is a front view of a large seaplane to which the invention is applied.

Fig. 2 is a top view of Fig. 1.

Fig. 3 is a longitudinal section of Fig. 1.

On the main wing 1 of the air plane the engine wing 2 has been arranged on interplane stays 3. Twelve engines, six engines 4 at the front side and six engines 5 at the back are arranged in this engine wing together with their propellers and the other devices and parts belonging to the propelling means.

The size of the wing 2 has been chosen so, that at full power it keeps in equilibrium the weight of the engines, the propellers and of the further devices and parts which are used for propelling, and of the service filling as well as of the interplane-stays 3. The wing may not be smaller, because in that case a part of the said weight would come on the main wing, but on the other hand not larger because then the engine wing would exert an upwardly directed power on the main wing.

For the rest the airplane is so constructed that it has the most favourable shape, which is made possible by arranging the engines in the way as indicated according to the invention. 1 indicates the main wing, 6 the fuselage, 7 and 8 being the rudders.

I claim:

A power plant for aircraft, comprising a main plane, a power carrying plane spaced apart from and connected to the main plane, and impelling units carried by the power carrying plane, said power carrying plane being of such dimensions that at full power it keeps substantially in equilibrium the weight of the impelling units, the power carrying plane and the service load.

In testimony whereof I affix my signature.

LUDWIG ADRIAN SANDERS.